US012033059B2

(12) United States Patent
Zhu et al.

(10) Patent No.: US 12,033,059 B2
(45) Date of Patent: Jul. 9, 2024

(54) METHOD FOR PREDICTING BEARING LIFE BASED ON HIDDEN MARKOV MODEL AND TRANSFER LEARNING

(71) Applicant: SOOCHOW UNIVERSITY, Suzhou (CN)

(72) Inventors: Jun Zhu, Suzhou (CN); Changqing Shen, Suzhou (CN); Nan Chen, Suzhou (CN); Dongmiao Song, Suzhou (CN); Jianqin Zhou, Suzhou (CN); Jun Wang, Suzhou (CN); Juanjuan Shi, Suzhou (CN); Weiguo Huang, Suzhou (CN); Zhongkui Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 757 days.

(21) Appl. No.: 17/285,348

(22) PCT Filed: Aug. 7, 2020

(86) PCT No.: PCT/CN2020/107716
§ 371 (c)(1),
(2) Date: Apr. 14, 2021

(87) PCT Pub. No.: WO2021/042935
PCT Pub. Date: Mar. 11, 2021

(65) Prior Publication Data
US 2021/0374506 A1 Dec. 2, 2021

(30) Foreign Application Priority Data
Sep. 5, 2019 (CN) .......................... 201910838978.8

(51) Int. Cl.
*G06N 3/04* (2023.01)
*G06N 3/047* (2023.01)
*G06N 3/08* (2023.01)

(52) U.S. Cl.
CPC ............... *G06N 3/047* (2023.01); *G06N 3/08* (2013.01)

(58) Field of Classification Search
CPC .......... G06N 3/047; G06N 3/08; G06N 3/048; G06N 20/00; G06N 7/01; G01M 13/04
See application file for complete search history.

(56) References Cited

U.S. PATENT DOCUMENTS

| 2015/0262060 A1 | 9/2015 | Husain et al. |
| 2018/0121793 A1* | 5/2018 | Bhandary .......... G05B 23/0254 |

FOREIGN PATENT DOCUMENTS

| CN | 104504296 A | * | 4/2015 | |
| CN | 106885697 A | * | 6/2017 | .......... G01M 13/045 |

(Continued)

OTHER PUBLICATIONS

Wang, Fengtao, et al. Remaining life prediction of rolling bearing based on PCA and improved logistic regression model. Journal of Vibroengineering, 2016, vol. 18, No. 8, p. 5192-5203. (Year: 2016).*

(Continued)

*Primary Examiner* — Jordany Nunez
(74) *Attorney, Agent, or Firm* — SZDC Law PC (57) ABSTRACT

The present invention discloses a method for predicting bearing life based on a hidden Markov model (HMM) and transfer learning, including the following steps: (1) acquiring an original signal of full life of a rolling bearing; and extracting a feature set including a time domain feature, a time-frequency domain feature, and a trigonometric function feature; (2) inputting the feature set into an HMM to predict a hidden state, to obtain a failure occurrence time (FOT); (3) constructing a multilayer perceptron (MLP) model, obtaining a domain invariant feature and an optimal model parameter, and obtaining a neural network life prediction model; and (4) inputting the remaining target domain feature sets (Continued)

into the neural network life prediction model, and predicting the remaining life of the bearing. In the present invention, MLP-based transfer learning is used to resolve distribution differences in a source domain and a target domain caused by different operating conditions.

10 Claims, 7 Drawing Sheets

(56) References Cited

FOREIGN PATENT DOCUMENTS

| CN | 107101828 A | 8/2017 |
|----|-------------|--------|
| CN | 107817106 A | 3/2018 |
| CN | 109472241 A | 3/2019 |
| CN | 110555273 A | 12/2019 |

OTHER PUBLICATIONS

Li, Xiaochuan, et al. Remaining useful life prediction of rolling element bearings using supervised machine learning. Energies, 2019, vol. 12, No. 14, p. 2705. (Year: 2019).*

Prakash, G.; Narasimhan, S.; Pandey, M. D. Condition based maintenance of low speed rolling element bearings using hidden markov model. International Journal of Prognostics and Health Management, 2017, vol. 8, No. 1. (Year: 2017).*

Meng, Zong, et al. Remaining useful life prediction of rolling bearing using fractal theory. Measurement, 2020, vol. 156, p. 107572. (Year: 2015).*

Sun, Chuang ; Ma, Meng ; Zhao, Zhibin ; Tian, Shaohua ; Yan, Ruqiang ; Chen, Xuefeng; Deep Transfer Learning Based on Sparse Autoencoder for Remaining Useful Life Prediction of Tool in Manufacturing IEEE transactions on industrial informatics, Apr. 2019, vol. 15 (4), p. 2416-2425 (Year: 2019).*

Zhen Chen, Yaping Li, Tangbin Xia, Ershun Pan, Hidden Markov model with auto-correlated observations for remaining useful life prediction and optimal maintenance policy, Reliability Engineering & System Safety, vol. 184, 2019 (Year: 2019).*

Deutsch J, He M, He D. Remaining Useful Life Prediction of Hybrid Ceramic Bearings Using an Integrated Deep Learning and Particle Filter Approach. Applied Sciences. 2017; 7(7):649. https://doi.org/10.3390/app7070649 (Year: 2017).*

Deutsch J, He M, He D. Remaining Useful Life Prediction of Hybrid Ceramic Bearings Using an Integrated Deep Learning and Particle Filter Approach. Applied Sciences. 2017; 7(7):649. (Year: 2017).*

Deutsch J, He M, He D. Remaining Useful Life Prediction of Hybrid Ceramic Bearings Using an Integrated Deep Learning and Particle Filter Approach. Applied Sciences. (Year: 2019).*

Jun Zhu et al, "A new data-driven transferable remaining useful life prediction approach for bearing under different working conditions" Mechanical Systems and Signal Processing 139 (2020) 106602, pp. 1-17 (May 31, 2020).

* cited by examiner

METHOD FOR PREDICTING BEARING LIFE BASED ON HIDDEN MARKOV MODEL AND TRANSFER LEARNING

This application is the National Stage Application of PCT/CN2020/107716, filed on Aug. 7, 2020, which claims priority to Chinese Patent Application No.: 201910838978.8, filed on Sep. 5, 2019, which is incorporated by reference for all purposes as if fully set forth herein.

FIELD OF THE INVENTION

The present invention relates to the field of operation state and life prediction technology for rolling bearings, and specifically, to a method for predicting bearing life based on a hidden Markov model (HMM) and transfer learning.

DESCRIPTION OF THE RELATED ART

A rolling bearing is one of the parts that are most widely used in industrial sectors such as aviation and aerospace, electricity, petrochemistry, metallurgy, and machinery and are most prone to damage. A working state of rotating machinery is closely correlated to a rolling bearing. According to statistics, in rotating mechanical equipment using a rolling bearing, about 30% of mechanical failures are correlated to bearing damage. It is of great significance to predict bearing life to ensure a normal production process and avoid economic loss.

There are usually four types of life prediction methods: a method based on a physical model, a method based on a statistical model, a method based on artificial intelligence, and a hybrid method. The method based on artificial intelligence has a powerful modeling capability for the remaining life to be directly deduced from acquired status monitoring data, and therefore has been the focus of research. Conventional shallow models such as an artificial neural network, a support vector machine, a relevance vector machine, and a random forest and deep learning models such as a convolutional neural network, an auto encoder, a restricted Boltzmann machine, and a recurrent neural network are all applied to life prediction.

However, current life prediction methods usually have two disadvantages: 1) A failure occurrence time (FOT) is ignored or empirically determined. However, it is very important to accurately determine a FOT because information such as noise that is not correlated to a failure is suppressed and at the same time important failure degradation information is kept. 2) Samples in source domains and target domains need to conform to the same data distribution. However, because of different operating conditions, distribution differences exist in source domains and target domains, leading to a reduced model generalization capability.

SUMMARY OF THE INVENTION

Embodiments of the present invention provide a method for predicting bearing life based on an HMM and transfer learning, so that a FOT is automatically detected by using an HMM, and subsequently multilayer perceptron (MLP)-based transfer learning is used to resolve distribution differences in a source domain and a target domain caused by different operating conditions, to improve the accuracy and efficiency of life prediction for a rolling bearing.

To resolve the foregoing technical problem, the present invention provides a method for predicting bearing life based on an HMM and transfer learning, including the following steps:
(1) acquiring an original signal of full life of the operation of a rolling bearing;
(2) extracting a time domain feature, a time-frequency domain feature, and a trigonometric function feature from the original signal, to form a feature set;
(3) converting the feature set into an observation sequence to input the observation sequence into an HMM, and predicting a hidden state in an unsupervised manner, to obtain a FOT;
(4) using the feature set of the operation of the rolling bearing after the FOT for life prediction of the rolling bearing: constructing an MLP model according to a transfer learning framework, combining feature sets from all source domains and some target domains into a training set to input the training set into the MLP model, training a proposed optimized target to obtain a domain invariant feature and an optimal model parameter, and substituting the optimal model parameter into the perceptron model to obtain a neural network life prediction model; and
(5) combining the remaining target domain feature sets into a test set to input the test set into the neural network life prediction model, and predicting the remaining life of the bearing according to an output value.

In a preferred embodiment of the present invention, further, the MLP model has an input layer, two hidden layers (HL1 and HL2), and an output layer; and an output of the hidden layer (HL2) is used as a domain adaptation target to construct a domain adaptation module, to reduce differences between different domains to obtain the domain invariant feature.

In a preferred embodiment of the present invention, further, the domain adaptation module includes a feature extractor and a domain classifier, and the domain classifier has a hidden layer (HL3) and a domain determination output layer; and features are aligned in a manner of a generative adversarial network between the feature extractor and the domain classifier, to obtain the domain invariant feature.

In a preferred embodiment of the present invention, further, the domain adaptation module includes a domain distribution difference measurement, and the domain distribution difference measurement uses a maximum average difference for measurement.

In a preferred embodiment of the present invention, further, the optimal model parameter includes the input layer, the two hidden layers (HL1 and HL2), and a network parameter of each of the output layer and network parameters between the layers.

In a preferred embodiment of the present invention, further, the obtaining the FOT in step (3) includes:
(3-1) estimating a parameter A. of the HMM based on an expectation-maximization algorithm;
(3-2) giving an observation sequence $O(O_1, O_2, \ldots O_K, \ldots O_T)$, and maximizing $P(S|\lambda, O)$ based on the Viterbi algorithm to determine an optimal hidden state sequence $S(s_1, s_2, \ldots s_K, \ldots s_T)$; and
(3-3) when a hidden state failure keeps occurring in the hidden state sequence $S(s_1, s_2, \ldots s_K, \ldots s_T)$, obtaining the FOT.

In a preferred embodiment of the present invention, further, the proposed optimized target in step (4) includes a regression loss of a source domain sample, and the regression loss of the source domain sample is:

$$L_r = \frac{1}{m}\sum_{i=1}^{m}(y_i - \hat{y}_i)^2,$$

where m is batch sample data; $y_i$ is an actual sample label; and $\hat{y}_i$ is a predicted sample label;

$$\hat{y} = \varphi(W_3 h_2 + b_3);$$

$$h_2 = f(W_2 h_1 + b_2);$$

$$h_1 = f(W_1 x + b_1);$$

$\varphi$ is a Sigmoid activation function; $W_3$ is a weight coefficient of the hidden layer HL2 and the output layer; $b_3$ is a bias coefficient of the hidden layer HL2 and the output layer; f is a ReLU activation function; $W_2$ is a weight coefficient of the hidden layer HL1 and the hidden layer HL2; $b_2$ is a bias coefficient of the hidden layer HL1 and the hidden layer HL2; $W_1$ is a weight coefficient of the input layer and the hidden layer HL1; $b_1$ is a bias coefficient of the input layer and the hidden layer HL1; and x is an input sample.

In a preferred embodiment of the present invention, further, the proposed optimized target in step (4) includes a domain classification loss of source domains and target domains, and the domain classification loss of source domains and target domains is:

$$L_d = -\frac{1}{m}\sum_{i=1}^{m}(D_i \log d(x_i) + (1 - D_i)\log(1 - d(x_i)));$$

$D_i$ represents an actual domain label; $d(x_i)$ represents a predicted sample label;
where $$d = \frac{1}{1 + e^{-(W_d f_3 + b_d)}};$$

$W_d$ is a weight coefficient of the hidden layer HL3 and the domain determination output layer; $b_d$ is a bias coefficient of the hidden layer HL3 and the domain determination output layer; and $f_3$ is an output of the hidden layer HL3.

In a preferred embodiment of the present invention, further, the proposed optimized target in step (4) includes a maximum average loss of source domains and target domains, and the maximum average loss of source domains and target domains is:

$$L_{MMD} = \frac{4}{m^2}\sum_{i=1}^{\frac{m}{2}}\sum_{j=1}^{\frac{m}{2}} K(h_{2_i}^s, h_{2_j}^s) + \frac{4}{m^2}\sum_{i=1}^{\frac{m}{2}}\sum_{j=1}^{\frac{m}{2}} K(h_{2_i}^t, h_{2_j}^t) - \frac{8}{m^2}\sum_{i=1}^{\frac{m}{2}}\sum_{j=1}^{\frac{m}{2}} K(h_{2_i}^s, h_{2_j}^t),$$

where K(.,.) represents a Gaussian radial kernel function; $h_2^s$ and $h_2^t$ respectively represent outputs of source domains and target domains in the hidden layer HL2; and a batch sample quantity of source domains and target domains is $\frac{m}{2}$.

In a preferred embodiment of the present invention, further, in step (2), 13 time domain features, 16 time-frequency domain features, and 3 trigonometric function features are extracted.

The beneficial effects of the present invention are as follows:

1. In the method for predicting bearing life based on an HMM and transfer learning of the present invention, an HMM is used to adaptively determine a FOT to automatically extract varied information hidden in existing data, thereby getting rid of the dependence on engineering experience and saving labor and time;
2. In the method for predicting bearing life based on an HMM and transfer learning of the present invention, a domain classifier and a domain distribution difference measurement are used to reduce differences between a source domain and a target domain, to implement more efficient transfer, thereby improving the accuracy and efficiency of life prediction for a rolling bearing.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Embodiment

This embodiment discloses a method for predicting bearing life based on an HMM and transfer learning, including the following steps.

(1) Acquire an original signal of full life of the operation of a rolling bearing.
(2) Extract 13 time domain features, 16 time-frequency domain features, and 3 trigonometric function features from the original signal, to form a feature set. For a specific feature description, see the following Table 1:

TABLE 1

| Type | Feature | | |
|---|---|---|---|
| *Description of extracted features* | | | |
| Time domain feature | F1: Entropy | F2: Energy | F3: Root mean square |
| | F4: Kurtosis | F5: Root mean square | F6: Absolute average value |
| | F7: Absolute maximum value | F8: Grade | F9: Shape factor |
| | F10: Kurtosis | F11: Allowance index | F12: Peak factor |
| | | F13: Standard deviation | |
| Time-frequency domain feature | F14-F29: Wavelet packet bandwidth Energy | | |
| Trigonometric function feature | F30: Inverse hyperbolic cosine standard deviation | | |
| | F31: Inverse hyperbolic sine standard deviation | | |
| | F32: Arc tangent standard deviation | | |

Two groups of sensors are respectively located in an X axis direction and a Y axis direction to acquire the original signal of the full life of the operation of the bearing. The full life herein includes a full time period from the moment when the bearing is mounted and put into use to the moment when the bearing fails. Each group of sensors correspondingly extract more than 32 groups of features. In this way, features are extracted from different perspectives to reflect the degradation information of the bearing, to make it convenient to subsequently determine a FOT based on an HMM and predict bearing life based on transfer learning.

(3) Convert the feature set into an observation sequence to input the observation sequence into an HMM, and predict a hidden state in an unsupervised manner, to obtain a FOT.

Specifically, the obtaining the FOT includes:

(3-1) estimating a parameter λ of the HMM based on an expectation-maximization algorithm;

(3-2) giving an observation sequence $O(O_1, O_2, \ldots O_K, \ldots O_T)$, and maximizing $P(S|\lambda, O)$ based on the Viterbi algorithm to determine an optimal hidden state sequence $S(s_1, s_2, \ldots s_K, \ldots s_T)$; and (3-3) when a hidden state failure keeps occurring in the hidden state sequence $S(s_1, s_2, \ldots s_K, \ldots s_T)$, obtaining the FOT.

It is assumed that an occurrence probability satisfies Gaussian distribution, and hidden states only include a normal state and a failure state.

In the technical solution in this embodiment, an HMM is used to adaptively determine a FOT, thereby reducing manpower input because of the dependence on empirical knowledge, so that information such as noise that is not correlated to a failure can be efficiently suppressed and at the same time important failure degradation information can be kept.

(4) Use the feature set of the operation of the rolling bearing after the FOT for life prediction of the rolling bearing: constructing an MLP model according to a transfer learning framework, combining feature sets from all source domains and some target domains into a training set to input the training set into the MLP model, training a proposed optimized target to obtain a domain invariant feature and an optimal model parameter, and substituting the optimal model parameter into the perceptron model to obtain a neural network life prediction model.

(5) Combine the remaining target domain feature sets into a test set to input the test set into the neural network life prediction model, and predict the remaining life of the bearing according to an output value.

The MLP model has an input layer, two hidden layers HL1 and HL2, and an output layer. An output of the hidden layer HL2 is used as a domain adaptation target to construct a domain adaptation module, to reduce differences between different domains to obtain the domain invariant feature.

The domain adaptation module includes a feature extractor, a domain classifier, and a domain distribution difference measurement. The domain classifier has a hidden layer HL3 and a domain determination output layer. Features are aligned in a manner of a generative adversarial network between the feature extractor and the domain classifier, to obtain the domain invariant feature. Herein, the feature generated by the feature extractor is inputted into the domain classifier. The domain classifier distinguishes whether the feature generated by the feature extractor is from a source domain or a target domain. The feature extractor generates a feature to interfere with and confuse the domain classifier, making it impossible for the domain classifier to distinguish whether a feature is from a source domain or a target domain, so that the feature is domain invariant. The domain distribution difference measurement uses a maximum average difference for measurement.

The optimal model parameter includes a network parameter of each of the input layer, the two hidden layers (HL1 and HL2), and the output layer and network parameters between the layers.

The proposed optimized target includes a regression loss of a source domain sample, a domain classification loss of source domains and target domains, and a maximum average loss of source domains and target domains.

(I): The regression loss of the source domain sample is:

$$L_r = \frac{1}{m}\sum_{i=1}^{m}(y_i - \hat{y}_i)^2,$$

where m is batch sample data; $y_i$ is an actual sample label; and $\hat{y}_i$ is a predicted sample label;

$$\hat{y} = \varphi(W_3 h_2 + b_3);$$

$$h_2 = f(W_2 h_1 + b_2);$$

$$h_1 = f(W_1 x + b_1);$$

φ is a Sigmoid activation function; $W_3$ is a weight coefficient of the hidden layer HL2 and the output layer; $b_3$ is a bias coefficient of the hidden layer HL2 and the output layer; f is a ReLU activation function; $W_2$ is a weight coefficient of the hidden layer HL1 and the hidden layer HL2; $b_2$ is a bias coefficient of the hidden layer HL1 and the hidden layer HL2; $W_1$ is a weight coefficient of the input layer and the hidden layer HL1; $b_1$ is a bias coefficient of the input layer and the hidden layer HL1; and x is an input sample.

(II): The domain classification loss of source domains and target domains is:

$$L_d = -\frac{1}{m}\sum_{i=1}^{m}(D_i \log d(x_i) + (1-D_i)\log(1-d(x_i)));$$

$D_i$ represents an actual domain label; $d(x_i)$ represents a predicted sample label;
where $$d = \frac{1}{1+e^{-(W_d f_3 + b_d)}};$$

$W_d$ is a weight coefficient of the hidden layer HL3 and the domain determination output layer; $b_d$ is a bias coefficient of the hidden layer HL3 and the domain determination output layer; and $f_3$ is an output of the hidden layer HL3.

(III): The maximum average loss of source domains and target domains is:

$$L_{MMD} = \frac{4}{m^2}\sum_{i=1}^{\frac{m}{2}}\sum_{j=1}^{\frac{m}{2}} K(h_{2_i}^s, h_{2_j}^s) + \frac{4}{m^2}\sum_{i=1}^{\frac{m}{2}}\sum_{j=1}^{\frac{m}{2}} K(h_{2_i}^t, h_{2_j}^t) - \frac{8}{m^2}\sum_{i=1}^{\frac{m}{2}}\sum_{j=1}^{\frac{m}{2}} K(h_{2_i}^s, h_{2_j}^t),$$

where $K(.,.)$ represents a Gaussian radial kernel function; $h_2^s$ and $h_2^t$ respectively represent outputs of source domains and target domains in the hidden layer HL2; and a batch sample quantity of source domains and target domains is $$\frac{m}{2}.$$

A final optimized target function may be written as:

$$L_{final} = L_r - \lambda L_d + \mu L_{MMD},$$

where $\lambda$ and $\mu$ are nonnegative penalty factors, $\theta_f$, $\theta_r$, and $\theta_d$ are respectively defined as parameters of a feature extractor, a life predictor, and a domain classifier, and the optimized target function may further be represented as:

$$L_{final}(\theta_f, \theta_r, \theta_d) = L_r(\theta_f, \theta_r) - \lambda L_d(\theta_f, \theta_d) + \mu L_{MMD}(\theta_f).$$

Saddle points $\hat{\theta}_f$, $\hat{\theta}_r$, and $\hat{\theta}_d$ may be found by using the following expressions:

$$(\theta_f, \theta_r) = \arg\min L_{final}(\theta_f, \theta_r, \theta_d); \text{ and}$$

$$\theta_d = \arg\max L_{final}(\theta_f, \theta_r, \theta_d).$$

In the present invention, a random gradient descent method is used to obtain updated parameters $\theta_f$, $\theta_r$, and $\theta_d$. Details are as follows:

$$\theta_f \leftarrow \theta_f - \eta\left(\frac{\partial L_r}{\partial \theta_f} - \lambda\frac{\partial L_d}{\partial \theta_f} + \mu\frac{\partial L_{MMD}}{\partial \theta_f}\right);$$

$$\theta_r \leftarrow \theta_r - \eta\frac{\partial L_r}{\partial \theta_r}; \text{ and}$$

$$\theta_d \leftarrow \theta_d - \eta\frac{\partial L_d}{\partial \theta_d},$$

where $\eta$ is a learning rate.

Figure 1:
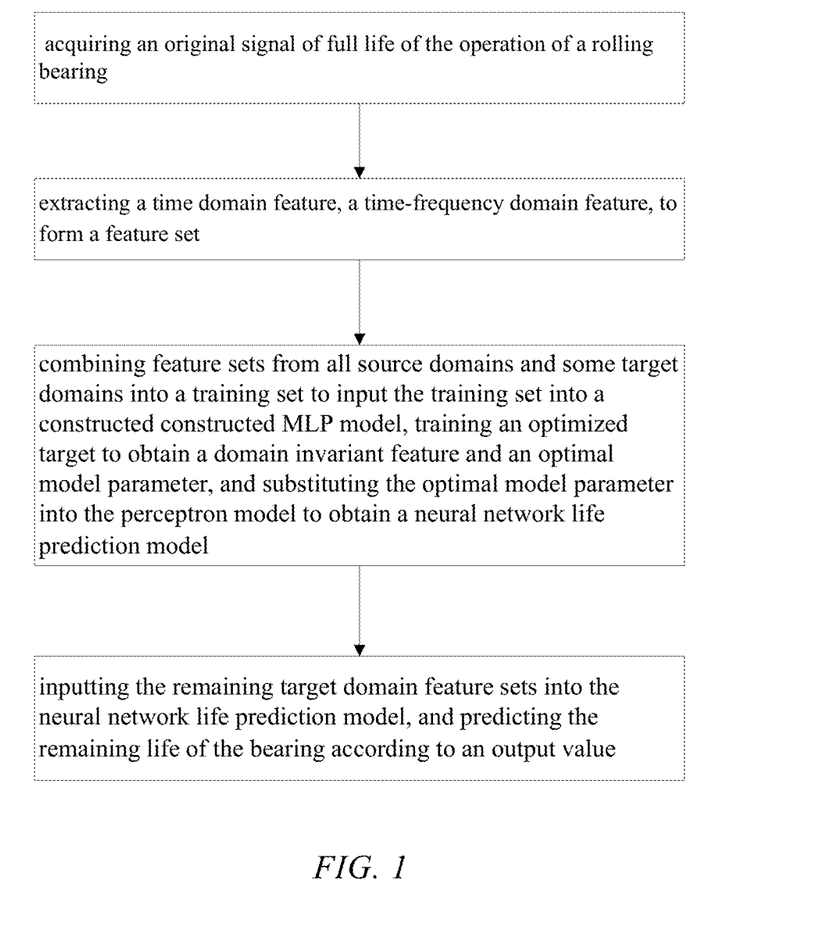
FIG. 1 is a flowchart of a method for predicting bearing life based on an HMM and transfer learning.
Figure 1A:
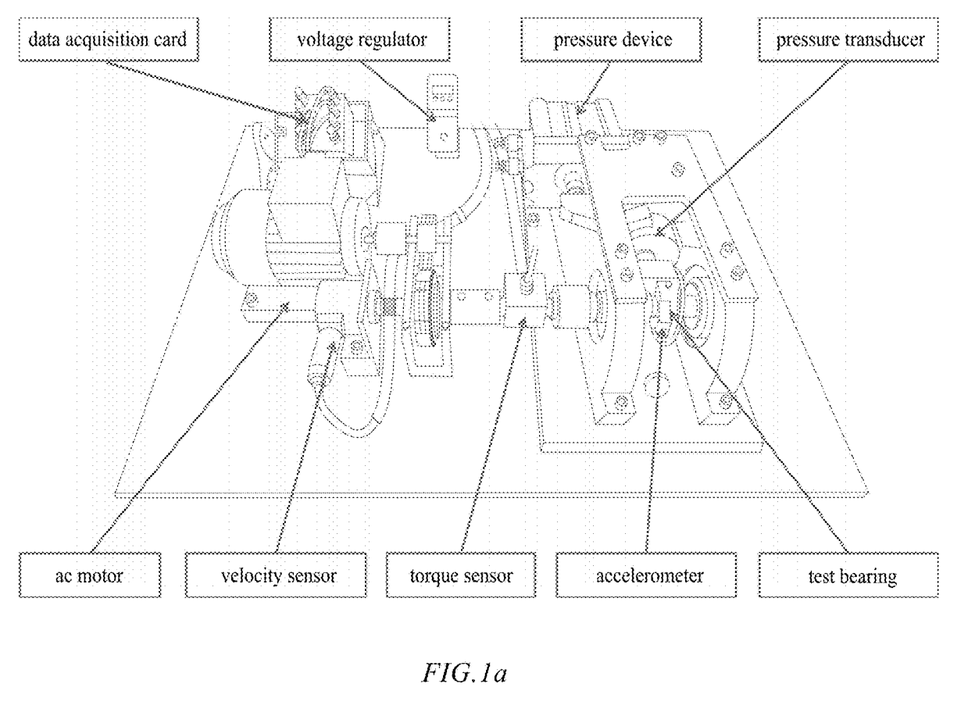
FIG. 1a shows a full-life bearing test platform.

Actual experimental data is combined below to describe this embodiment in detail:

FEMTO-ST is used as an example. As shown in FIG. 1a, a test platform of the rolling bearing includes one rotating part, one degradation generation part, and one data acquisition apparatus. Loads are applied to accelerate the degradation of the bearing. An acquired signal has two channels (x and y), and the sampling frequency of the signal is 25600 Hz. Each acquired sample duration is 0.1 s, and the sampling interval is 10 s. When the vibration strength of the signal reaches a particular degree, the experiment stops for safety. The parameters of the experimental bearing are shown in Table 2. Table 3 gives the description of the acquired bearing data, including three different operating conditions (A, B, and C).

TABLE 2

Parameters of an experimental bearing

| Pitch circle diameter | Roller diameter | Roller quantity | Contact angle |
| --- | --- | --- | --- |
| 25.6 mm | 3.5 mm | 13 | 0° |

TABLE 3

Description of bearing data

|  | A | B | C |
| --- | --- | --- | --- |
| Load (N) | 4000 | 4200 | 5000 |
| Rotational speed (rpm) | 1800 | 1650 | 1500 |
|  | Bearing 1-1 | Bearing 2-1 | Bearing 3-1 |
|  | Bearing 1-2 | Bearing 2-2 | Bearing 3-2 |
|  | Bearing 1-3 | Bearing 2-3 | Bearing 3-3 |
|  | Bearing 1-4 | Bearing 2-4 |  |
|  | Bearing 1-5 | Bearing 2-5 |  |
|  | Bearing 1-6 | Bearing 2-6 |  |
|  | Bearing 1-7 | Bearing 2-7 |  |

In this embodiment, two transfer learning tasks A→B and A→C are processed.

Because the present invention focuses on unsupervised transfer learning, the training set includes all labeled source domain samples and some label-less target domain samples. The test set includes the remaining label-less target domain samples. Details are shown in Table 4.

TABLE 4

Transfer learning task

| Transfer task | Training set | Test set |
| --- | --- | --- |
| A→B | Labeled: Bearing 1-1 to bearing 1-7<br>Label-less: Bearing 2-1 to bearing 2-2 | Bearing 2-6 |

TABLE 4-continued

Transfer learning task

| Transfer task | Training set | Test set |
|---|---|---|
| A→C | Labeled: Bearing 1-1 to bearing 1-7<br>Label-less: Bearing 3-1 to bearing 3-2 | Bearing 3-3 |

Figure 2:
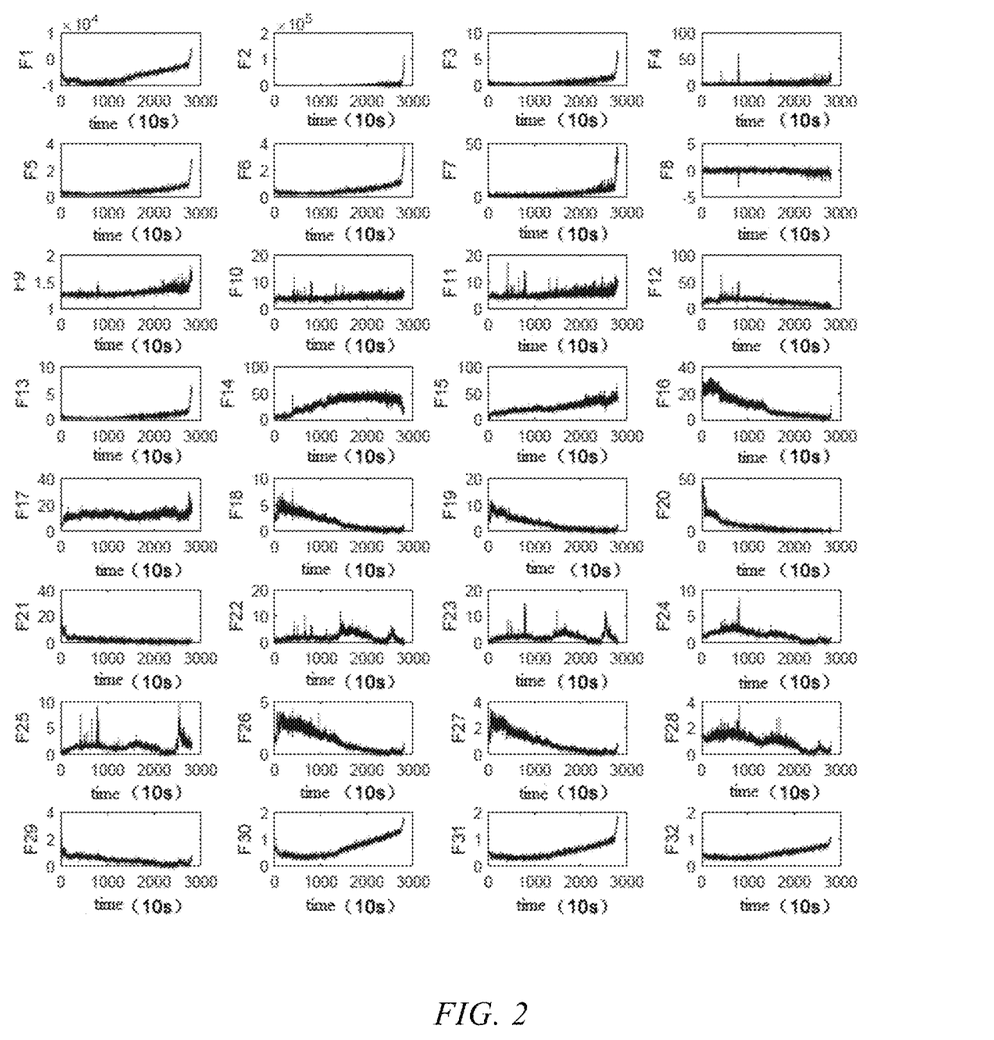
FIG. 2 shows features extracted from signals acquired in the horizontal direction of a bearing 1-1.

According to feature extraction in step 1, a total of 64 features are extracted and used as inputs of an HMM and inputs of a subsequent MLP model. The bearing 1-1 is used as an example. 32 features extracted in the horizontal direction are shown in FIG. 2.

Figure 3:
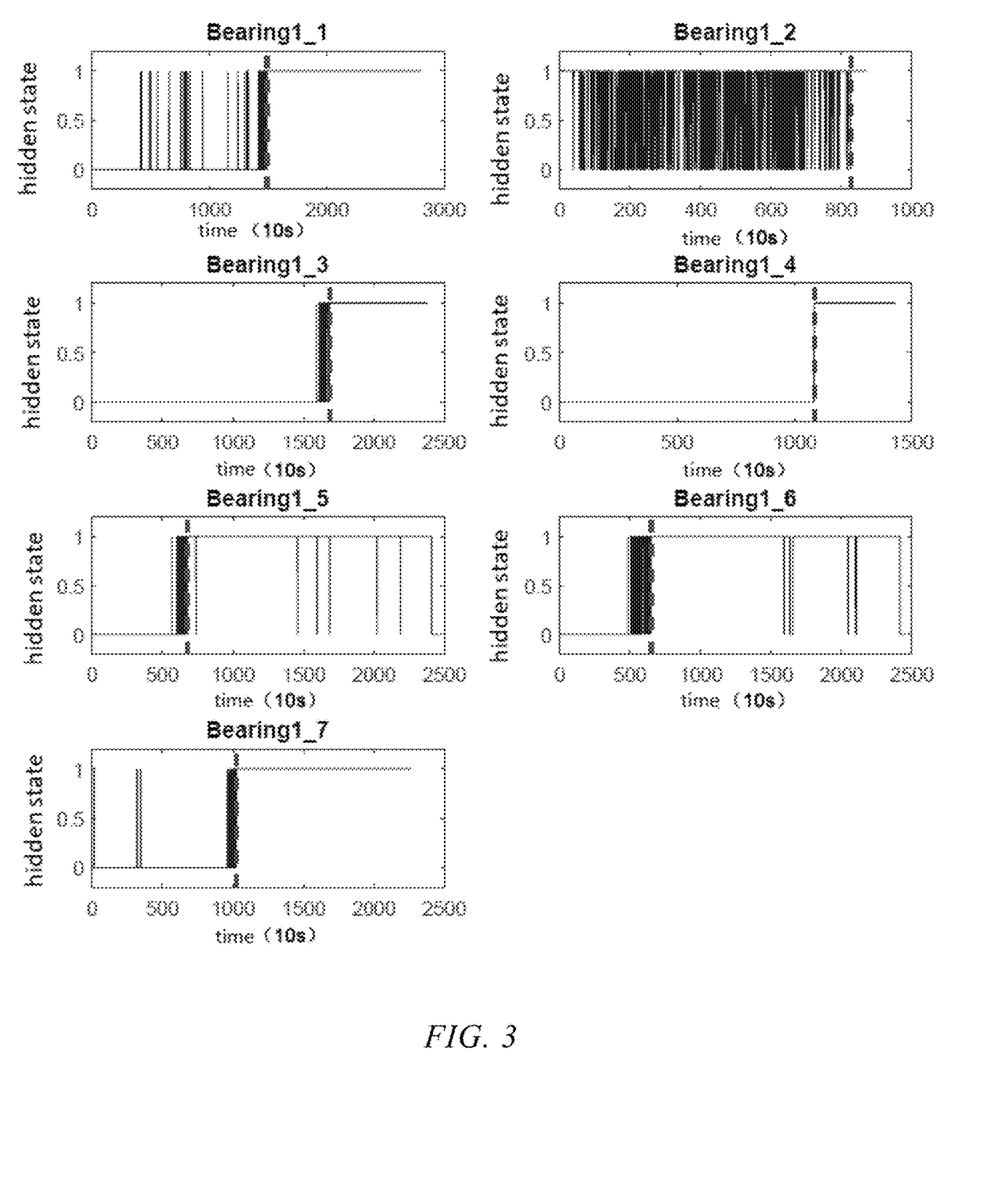
FIG. 3 is a FOT obtained for a bearing by using an HMM in a source domain.
Figure 4:
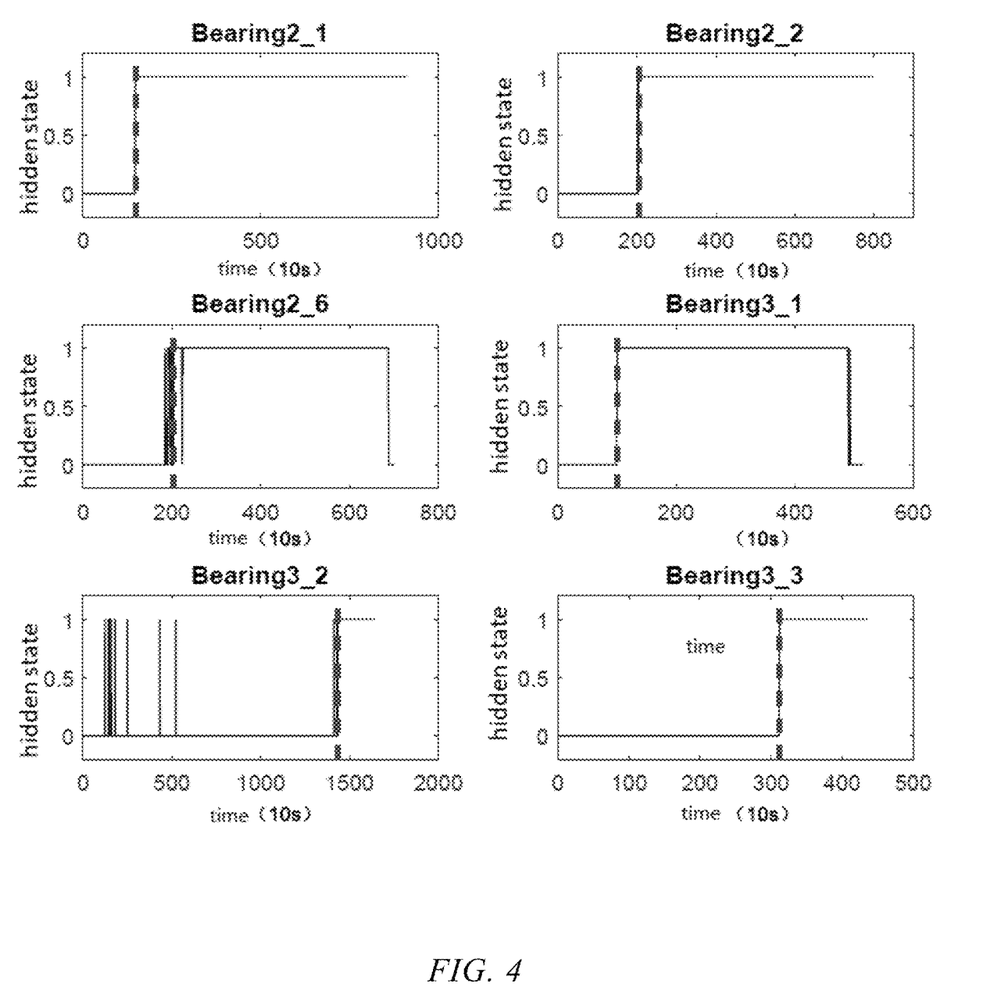
FIG. 4 is a FOT obtained for a bearing by using an HMM in a target domain.

Before the feature set is inputted into the HMM, features are normalized. According to step 3, the hidden state is successfully predicted, as shown in FIGS. 3 and 4. When consecutive failure states have occurred over five times, the FOT can be determined.

Figure 5:
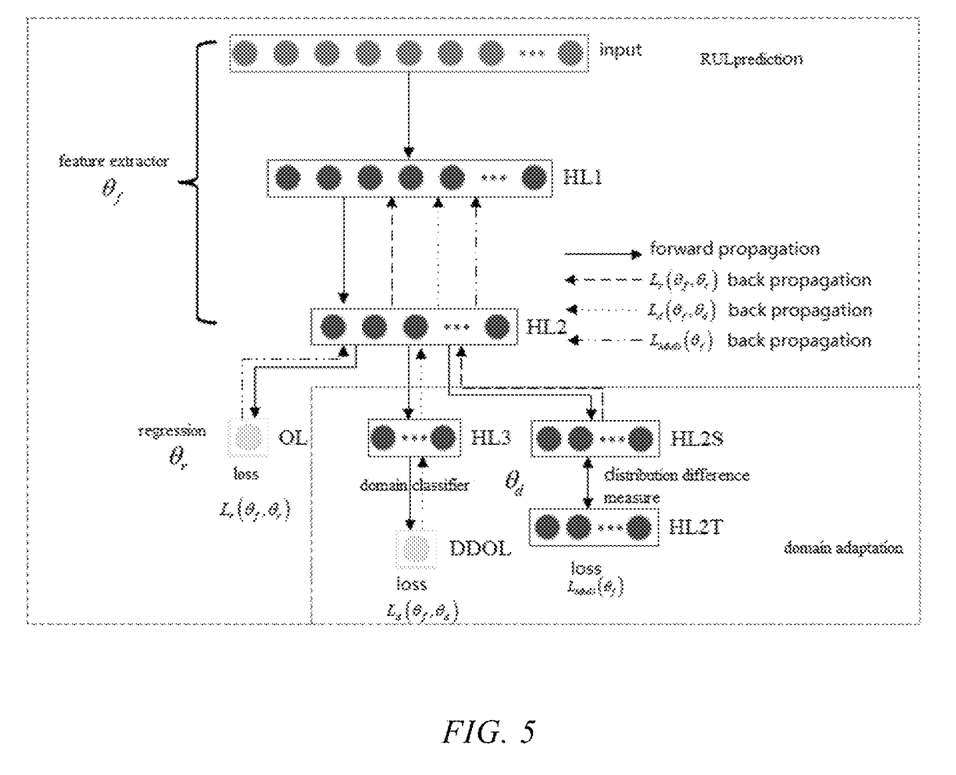
FIG. 5 shows the structure of transfer learning.
Figure 6:
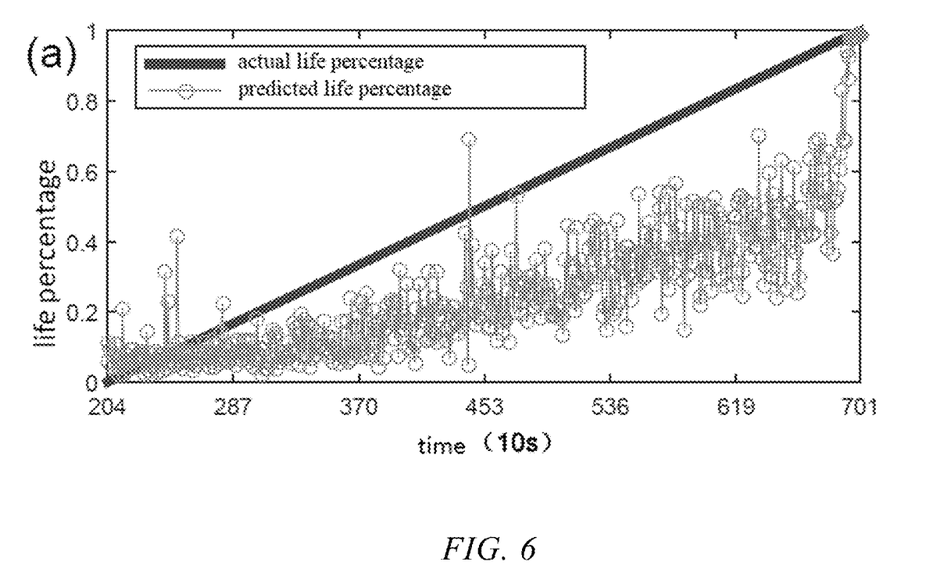
FIG. 6 shows a life prediction result of a bearing 2-6.
Figure 7:
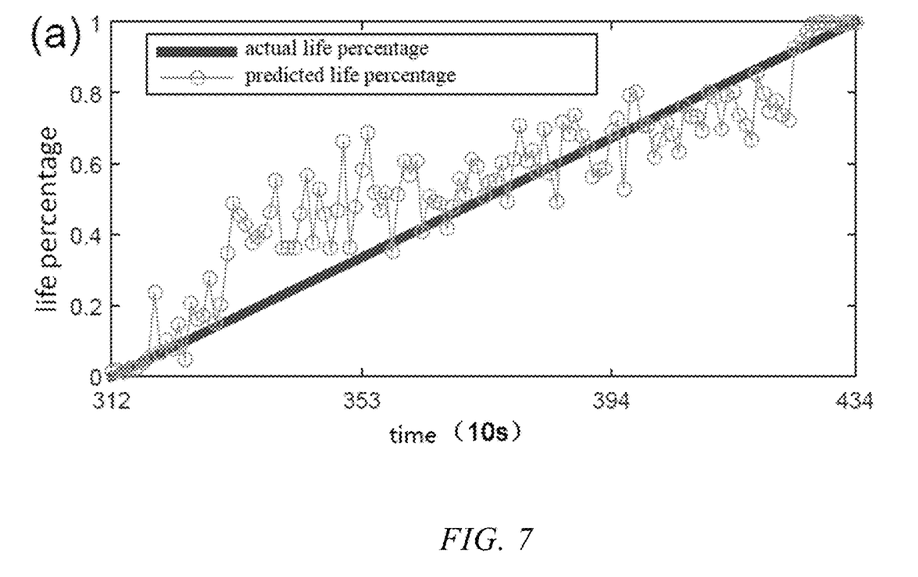
FIG. 7 shows a life prediction result of a bearing 3-3.
Figure 8:
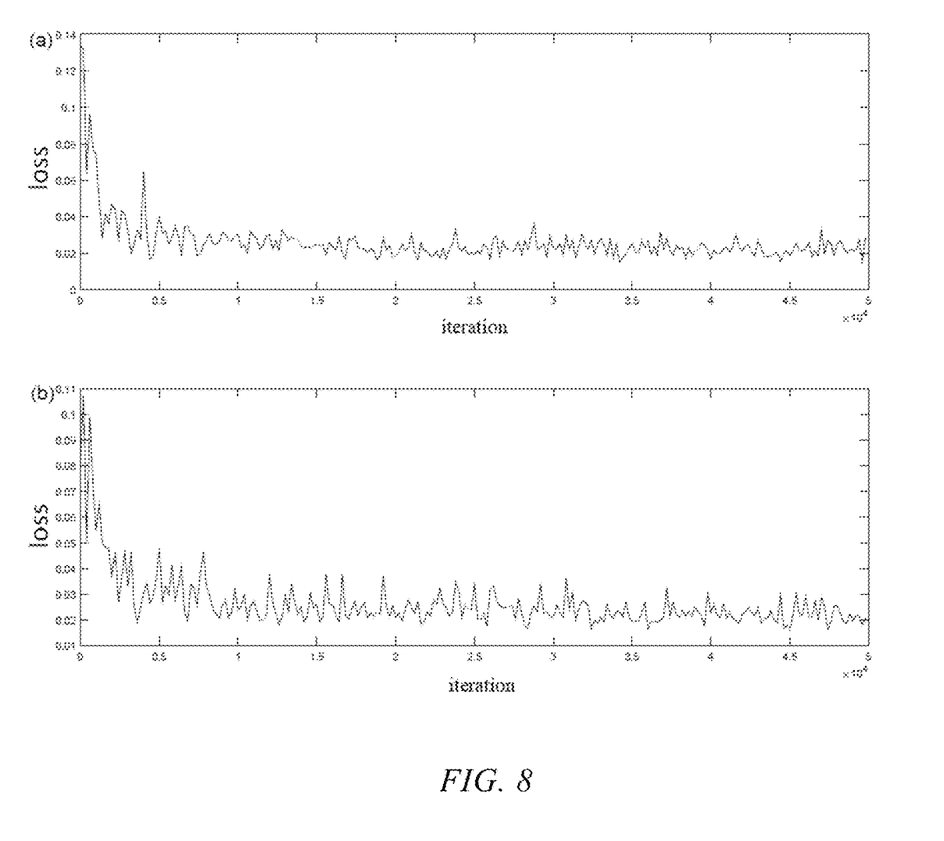
FIG. 8 shows an iteration loss in the training of transfer tasks A→B and A→C.

Once the FOT is determined, a label corresponding to a sample can be added. In the present invention, a life percentage is used as a label. For example, the full life of one bearing is 3000 s. The FOT is determined to be 1000 s by using the HMM. In this case, if the current time is 2000 s, the life percentage is 50%. According to step 4, a transfer learning framework is shown in FIG. 5. It is set that the MLP model includes four layers, which are respectively an input layer Input, two hidden layers HL1 and HL2, and an output layer OL. For the structural parameters of the MLP model, reference may be made to Table 5. A quantity of neurons in the domain adaptation module is 8. The learning rate η is set to 0.0001, the batch sample quantity is set to 40, and the number of training iterations is set to 50000. Hyper parameters in the optimized target are empirically selected. The training set (including labeled source domain samples and label-less target domain samples) is inputted. The proposed optimized target is used to obtain network parameters of each layer of the MLP model. After all parameters have been trained, only the test set (the remaining label-less target domain samples) needs to be inputted to implement the life prediction of a rolling bearing. Table 6 shows prediction errors of test samples in different transfer tasks. To better present a prediction effect, as shown in FIG. 6 and FIG. 7, in the present invention, a predicted life percentage and an actual life percentage are compared, and it may be seen that the predicted life has an increasing trend, indicating the efficiency of the method provided in the present invention. Finally, as shown in FIG. 8, for the transfer tasks A→B and A→C, the loss of training becomes stable after 3000 times of iteration. Therefore, the parameters of the MLP model can converge.

TABLE 5

Structural parameters of an MLP

| | Parameters | Activation function | Output dimensions |
|---|---|---|---|
| Input | / | / | 64 |
| HL1 | Connection weight: 64*32, and bias: 32*1 | ReLU | 32 |
| HL2 | Connection weight: 32*16, and bias: 16*1 | ReLU | 16 |
| OL | Connection weight: 16*1, and bias: 1 | Sigmoid | 1 |

TABLE 6

Prediction error of different transfer tasks

| Data set | Mean square error | Average absolute error | Standardized mean square error |
|---|---|---|---|
| A→B | 0.0890 | 0.2546 | 1.1697 |
| A→C | 0.0159 | 0.0983 | 0.2291 |

As can be seen from the analysis of application examples, the method for predicting bearing life based on an HMM and transfer learning provided in the present invention can overcome the assumptions in conventional data-driven-based algorithms that a FOT is manually and empirically selected and a source domain (a training set) and a target domain (a test set) need to have consistent data distribution. In the present invention, an HMM is used to automatically detect a FOT, and MLP-based transfer learning is then used to resolve distribution differences in a source domain and a target domain caused by different operating conditions. In the foregoing processing manner, information such as noise that is not correlated to a failure is suppressed and at the same time important failure degradation information is kept. In addition, a transferable feature can be obtained through transfer learning. Therefore, in the present invention, an HMM and a transfer learning method can be used to implement life prediction for a rolling bearing in different operating conditions.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A method for predicting bearing life based on a hidden Markov model and transfer learning, comprising the following steps:
   (1) acquiring an original signal of full life of the operation of a rolling bearing;
   (2) extracting a time domain feature, a time-frequency domain feature, and a trigonometric function feature from the original signal, to form a feature set;
   (3) converting the feature set into an observation sequence to input the observation sequence into the hidden Markov model, and predicting a hidden state in an unsupervised manner, to obtain a failure occurrence time;
   (4) using the feature set of the operation of the rolling bearing after the failure occurrence time for life prediction of the rolling bearing: constructing a multilayer perceptron model according to a transfer learning framework, combining feature sets from all source domains and some target domains into a training set to input the training set into the multilayer perceptron model, training a proposed optimized target to obtain a domain invariant feature and an optimal model parameter, and substituting the optimal model parameter into the perceptron model to obtain a neural network life prediction model; and
   (5) combining the remaining target domain feature sets into a test set to input the test set into the neural network life prediction model, and predicting the remaining life of the bearing according to an output value.

2. The method for predicting bearing life based on a hidden Markov model and transfer learning according to claim 1, wherein the multilayer perceptron model has an input layer, two hidden layers (HL1 and HL2), and an output layer; and an output of the hidden layer (HL2) is used as a domain adaptation target to construct a domain adaptation module, to reduce differences between different domains to obtain the domain invariant feature.

3. The method for predicting bearing life based on a hidden Markov model and transfer learning according to claim 2, wherein the domain adaptation module comprises a feature extractor and a domain classifier, and the domain classifier has a hidden layer (HL3) and a domain determination output layer; and features are aligned in a manner of a generative adversarial network between the feature extractor and the domain classifier, to obtain the domain invariant feature.

4. The method for predicting bearing life based on a hidden Markov model and transfer learning according to claim 2, wherein the domain adaptation module comprises a domain distribution difference measurement, and the domain distribution difference measurement uses a maximum average difference for measurement.

5. The method for predicting bearing life based on a hidden Markov model and transfer learning according to claim 2, wherein the optimal model parameter comprises the input layer, the two hidden layers (HL1 and HL2), and a network parameter of each of the output layer and network parameters between the layers.

6. The method for predicting bearing life based on a hidden Markov model and transfer learning according to claim 1, wherein the obtaining the failure occurrence time in step (3) comprises:
(3-1) estimating a parameter $\lambda$ of the hidden Markov model based on an expectation-maximization algorithm;
(3-2) giving an observation sequence $O(O_1, O_2, \ldots O_K, \ldots O_T)$, and maximizing $P(S|\lambda, O)$ based on the Viterbi algorithm to determine an optimal hidden state sequence $S(s_1, s_2, \ldots s_K, \ldots s_T)$; and
(3-3) when a hidden state failure keeps occurring in the hidden state sequence $S(s_1, s_2, \ldots s_K, \ldots s_T)$, obtaining the FOT.

7. The method for predicting bearing life based on a hidden Markov model and transfer learning according to claim 2, wherein the proposed optimized target in step (4) comprises a regression loss of a source domain sample, and the regression loss of the source domain sample is:

$$L_r = \frac{1}{m}\sum_{i=1}^{m}(y_i - \hat{y}_i)^2,$$

wherein m is batch sample data; $y_i$ is an actual sample label; and $\hat{y}_i$ is a predicted sample label;

$\hat{y} = \varphi(W_3 h_2 + b_3);$ $h_2 = f(W_2 h_1 + b_2);$ $h_1 = f(W_1 x + b_1);$ $\varphi$ is a Sigmoid activation function; $W_3$ is a weight coefficient of the hidden layer HL2 and the output layer; $b_3$ is a bias coefficient of the hidden layer HL2 and the output layer; f is a ReLU activation function; $W_2$ is a weight coefficient of the hidden layer HL1 and the hidden layer HL2; $b_2$ is a bias coefficient of the hidden layer HL1 and the hidden layer HL2; $W_1$ is a weight coefficient of the input layer and the hidden layer HL1; $b_1$ is a bias coefficient of the input layer and the hidden layer HL1; and x is an input sample.

8. The method for predicting bearing life based on a hidden Markov model and transfer learning according to claim 3, wherein the proposed optimized target in step (4) comprises a domain classification loss of source domains and target domains, and the domain classification loss of source domains and target domains is:

$$L_d = -\frac{1}{m}\sum_{i=1}^{m}(D_i \log d(x_i) + (1 - D_i)\log(1 - d(x_i)));$$

$D_i$ represents an actual domain label; $d(x_i)$ represents a predicted sample label;
wherein $$d = \frac{1}{1 + e^{-(W_d f_3 + b_d)}};$$

$W_d$ is a weight coefficient of the hidden layer HL3 and the domain determination output layer; $b_d$ is a bias coefficient of the hidden layer HL3 and the domain determination output layer; and $f_3$ is an output of the hidden layer HL3.

9. The method for predicting bearing life based on a hidden Markov model and transfer learning according to claim 2, wherein the proposed optimized target in step (4) comprises a maximum average loss of source domains and target domains, and the maximum average loss of source domains and target domains is:

$$L_{MMD} = \frac{4}{m^2}\sum_{i=1}^{\frac{m}{2}}\sum_{j=1}^{\frac{m}{2}} K(h_{2_i}^s, h_{2_j}^s) + \frac{4}{m^2}\sum_{i=1}^{\frac{m}{2}}\sum_{j=1}^{\frac{m}{2}} K(h_{2_i}^t, h_{2_j}^t) - \frac{8}{m^2}\sum_{i=1}^{\frac{m}{2}}\sum_{j=1}^{\frac{m}{2}} K(h_{2_i}^s, h_{2_j}^t),$$

wherein $K(.,.)$ represents a Gaussian radial kernel function; $h_2^s$ and $h_2^t$ respectively represent outputs of source domains and target domains in the hidden layer HL2; and a batch sample quantity of source domains and target domains is $$\frac{m}{2}.$$

10. The method for predicting bearing life based on a hidden Markov model and transfer learning according to claim 1, wherein in step (2), 13 time domain features, 16 time-frequency domain features, and 3 trigonometric function features are extracted.

* * * * *